United States Patent
Park et al.

(10) Patent No.: US 11,425,360 B2
(45) Date of Patent: Aug. 23, 2022

(54) 3D DISPLAY APPARATUS HAVING LENTICULAR LENSES

(71) Applicant: LG Display Co., Ltd., Seoul (KR)

(72) Inventors: Myung-Soo Park, Gimpo-si (KR);
Hoon Kang, Goyang-si (KR);
Ju-Seong Park, Gimpo-si (KR);
Dong-Yeon Kim, Seoul (KR);
Young-Min Kim, Goyang-si (KR);
Se-Wan Oh, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/132,670

(22) Filed: Dec. 23, 2020

(65) Prior Publication Data
US 2021/0203914 A1    Jul. 1, 2021

(30) Foreign Application Priority Data
Dec. 31, 2019   (KR) .................. 10-2019-0180197

(51) Int. Cl.
*H04N 13/305*   (2018.01)
*H04N 13/32*    (2018.01)

(52) U.S. Cl.
CPC .......... *H04N 13/305* (2018.05); *H04N 13/32* (2018.05)

(58) Field of Classification Search
USPC ........................................................ 348/51
See application file for complete search history.

(56) References Cited

U.S. PATENT DOCUMENTS

| | | | | |
|---|---|---|---|---|
| 10,630,967 B2 * | 4/2020 | Wu | .......... | G02B 30/32 |
| 2010/0259697 A1 * | 10/2010 | Sakamoto | ............ | H04N 13/359 349/15 |
| 2011/0149392 A1 * | 6/2011 | Liao | ............ | G02F 1/1333 359/463 |
| 2013/0063421 A1 * | 3/2013 | Yoon | ............ | G02B 30/28 345/419 |
| 2013/0128354 A1 * | 5/2013 | Whangbo | ............ | G02B 30/27 359/463 |
| 2015/0279332 A1 * | 10/2015 | Hu | ............ | G09G 3/003 348/51 |

FOREIGN PATENT DOCUMENTS

| | | | |
|---|---|---|---|
| EP | 2515158 A1 * | 10/2012 | ........ G02B 27/2214 |
| KR | 10-2016397 B1 | 8/2019 | |

* cited by examiner

*Primary Examiner* — Behrooz M Senfi
(74) *Attorney, Agent, or Firm* — Birch, Stewart, Kolasch & Birch, LLP

(57) ABSTRACT

A 3D display apparatus in which lenticular lenses are disposed on a display panel is provided. The display panel can include pixel regions arranged in a pen-tile shape. For example, the display panel can include a first column of pixel regions in which a first pixel region displaying a first color and a second pixel region displaying a second color are alternatively disposed in a first direction, and a second column of pixel regions in which a third pixel region displaying a third color is disposed, and the first column and the second column can be alternatively disposed in a second direction perpendicular to the first direction. Each of the lenticular lenses can extend in an inclined direction. Thus, in the 3D display apparatus, the rate of color reproduction can be improved in a pen-tile shape.

6 Claims, 7 Drawing Sheets

3D DISPLAY APPARATUS HAVING LENTICULAR LENSES

CROSS-REFERENCE TO RELATED APPLICATIONS

This application claims the priority benefit of Korean Patent Application No. 10-2019-0180197, filed in the Republic of Korea on Dec. 31, 2019, the entire contents of which are hereby expressly incorporated by reference as if fully set forth herein into the present application.

BACKGROUND OF THE INVENTION

Field of the Invention

The present invention relates to a three-dimensional (3D) display apparatus in which lenticular lenses are disposed on a display panel.

Discussion of the Related Art

A display apparatus can provide a two-dimensional (2D) image and/or a 3D image to a user. For example, the display apparatus can be a 3D display apparatus in which lenticular lenses are disposed on a display panel. The display panel can realize an image provided to the user. For example, the display panel can include a plurality of pixel regions.

Each of the pixel regions can display a specific color. For example, a light-emitting device can be disposed in each pixel region. The light-emitting device can emit light displaying a specific color. For example, the light-emitting device can include a light-emitting layer between a first electrode and a second electrode.

The 3D display apparatus can superimpose light emitted from each pixel region of the display panel in a set region using the lenticular lenses, so that the 3D image provided to the user can be realized. However, when the pixel regions of the display panel are arranged in a pen-tile shape, each viewing portion of the lenticular lenses can have the different color ratio, and the quality of the image provided to the user can be deteriorated.

SUMMARY OF THE INVENTION

Accordingly, the present invention is directed to a 3D display apparatus that substantially obviates one or more problems due to limitations and disadvantages of the related art.

An object of the present invention is to provide a 3D display apparatus capable of maintaining a constant color ratio in each viewing point of the lenticular lenses which are disposed on the display panel including the pixel regions arranged in a pen-tile shape.

Additional advantages, objects, and features of the invention will be set forth in part in the description which follows and in part will become apparent to those having ordinary skill in the art upon examination of the following or can be learned from practice of the invention. The objectives and other advantages of the invention can be realized and attained by the structure particularly pointed out in the written description and claims hereof as well as the appended drawings.

To achieve these objects and other advantages and in accordance with the purpose of the invention, as embodied and broadly described herein, there is provided a 3D display apparatus comprising a display panel. The display panel includes a plurality of pixel regions including a first pixel region displaying a first color, a second pixel region displaying a second color, and a third pixel region displaying a third color. A first column of pixel regions in which the first pixel region and the second pixel region are alternatively disposed in a first direction, and a second column of pixel regions in which the third pixel region is disposed are alternatively disposed in a second direction perpendicular to the first direction. Lenticular lenses are disposed on the display panel. Each of the lenticular lenses extends obliquely. The inclination angle of each lenticular lens relative to the first direction is within a range of 35.71° to 38°.

For example, the inclination angle of each lenticular lens relative to the first direction can be 36.87° preferably.

The third pixel region can be alternately disposed with the first pixel region and the second pixel region in the second direction.

The length of the first pixel region in the first direction can be larger than the length of the first pixel region in the second direction.

In another embodiment, the 3D display apparatus includes a display panel. The display panel includes a plurality of pixel regions including a first pixel region displaying a first color, a second pixel region displaying a second color, and a third pixel region displaying a third color. A first column of pixel regions in which the first pixel regions and the second pixel regions are alternatively disposed in a first direction, and a second column of pixel regions in which the third pixel region is disposed are alternative disposed in a second direction perpendicular to the first direction. Lenticular lenses are disposed on the display panel. Each of the lenticular lenses extends in an inclined direction. The inclination angle of each lenticular lens relative to the first direction is within a range of 12.34° to 15.71°.

For example, the inclination angle of each lenticular lenses relative to the first direction can be 14.04° preferably.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
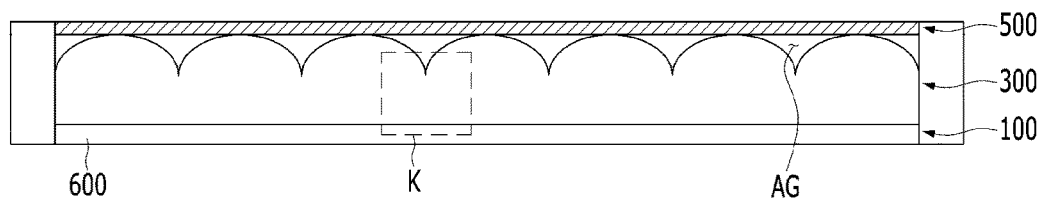
FIG. 1 is a view schematically showing a 3D display apparatus according to an embodiment of the present invention.

Hereinafter, details related to the above objects, technical configurations, and operational effects of the embodiments of the present invention will be clearly understood by the following detailed description with reference to the drawings, which illustrate some embodiments of the present invention. Here, the embodiments of the present invention are provided in order to allow the technical sprit of the present invention to be satisfactorily transferred to those skilled in the art, and thus the present invention can be embodied in other forms and is not limited to the embodiments described below.

In addition, the same or extremely similar elements can be designated by the same reference numerals throughout the specification, and in the drawings, the lengths and thickness of layers and regions can be exaggerated for convenience. It will be understood that, when a first element is referred to as being "on" a second element, although the first element can be disposed on the second element so as to come into contact with the second element, a third element can be interposed between the first element and the second element.

Here, terms such as, for example, "first" and "second" can be used to distinguish any one element with another element and do not necessarily define any order. However, the first element and the second element can be arbitrary named according to the convenience of those skilled in the art without departing the technical sprit of the present invention.

The terms used in the specification of the present invention are merely used in order to describe particular embodiments, and are not intended to limit the scope of the present invention. For example, an element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

EMBODIMENTS

Figure 2:
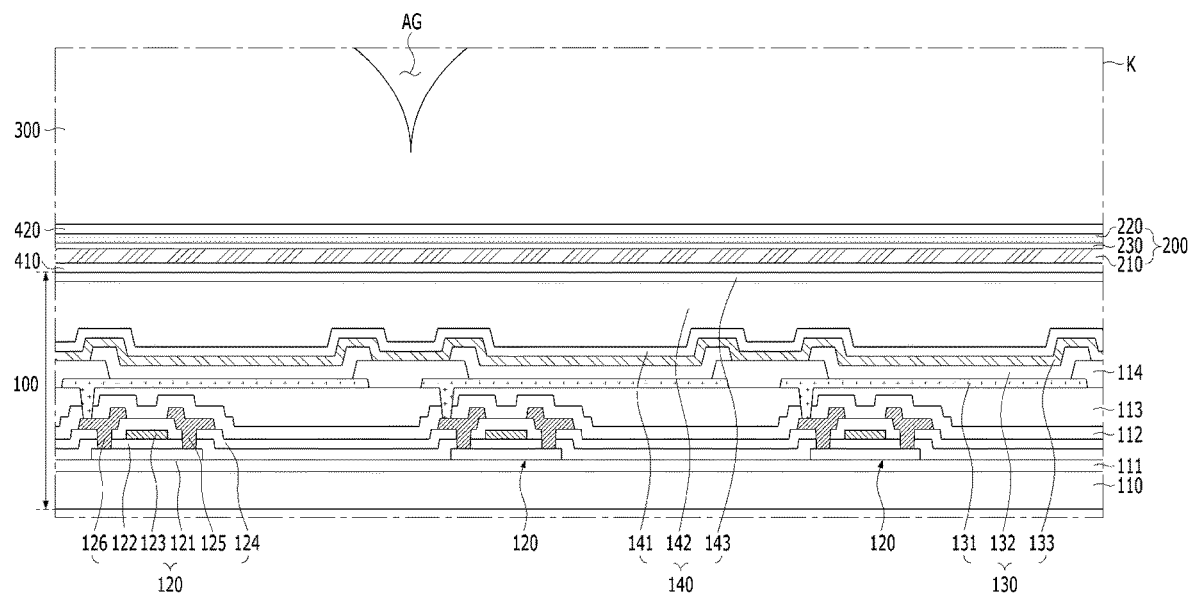
FIG. 2 is an enlarged view of K region in FIG. 1.
Figure 3:
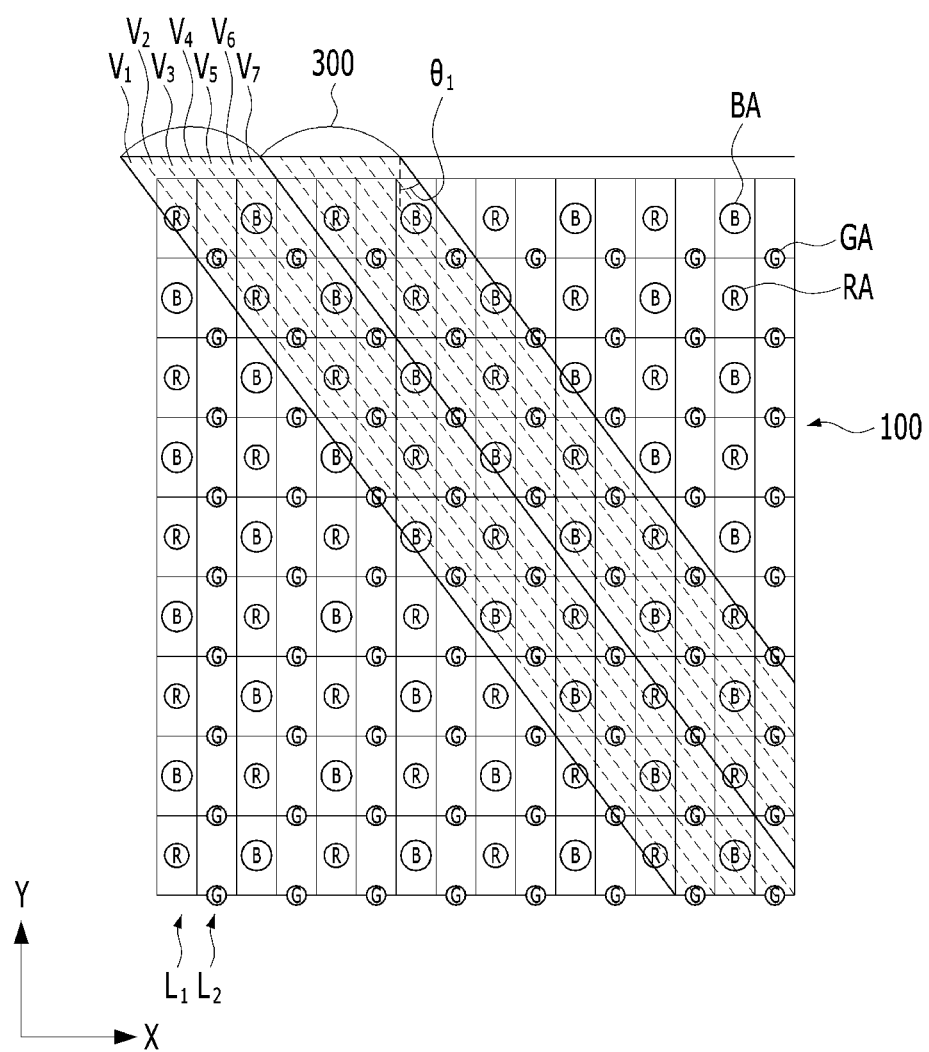
FIG. 3 is a view partially showing a plane of the 3D display apparatus according to the embodiment of the present invention.

FIG. 1 is a view schematically showing a 3D display apparatus according to an embodiment of the present invention. FIG. 2 is an enlarged view of K region in FIG. 1. FIG. 3 is a view partially showing a plane of the 3D display apparatus according to the embodiment of the present invention. All the components of the 3D display apparatus according to all embodiments of the present invention are operatively coupled and configured.

Referring to FIGS. 1 to 3, the 3D display apparatus according to the embodiment of the present invention can include a display panel 100. The display panel 100 can realize an image provided to a user. For example, the display panel 100 can include a plurality of light-emitting devices 130. Each of the light-emitting devices 130 can emit light displaying a specific color. For example, each of the light-emitting devices 130 can include a first electrode 131, a light-emitting layer 132 and a second electrode 133, which are sequentially stacked on a device substrate 110. The device substrate 110 can include an insulating material. For example, the device substrate 110 can include glass or plastic.

The first electrode 131 can include a conductive material. The first electrode 131 can include a material having high reflectance. For example, the first electrode 131 can include a metal, such as aluminum (Al) and silver (Ag). The first electrode 131 can have a multi-layer structure. For example, the first electrode 131 can have a structure in which a reflective electrode formed of a metal is disposed between transparent electrodes formed of a transparent conductive material, such as ITO and IZO.

The light-emitting layer 132 can generate light having luminance corresponding to a voltage difference between the first electrode 131 and the second electrode 133. For example, the light-emitting layer 132 can be an emission material layer (EML) having an emission material. The emission material can include an organic material, an inorganic material or a hybrid material. For example, the display panel 100 of the 3D display apparatus according to the embodiment of the present invention can be an OLED panel having the light-emitting layer 132 formed of an organic material.

The second electrode 133 can include a conductive material. The second electrode 133 can include a material different from the first electrode 131. For example, the second electrode 133 can be a transparent electrode formed of a transparent conductive material, such as ITO and IZO. Thus, in the 3D display apparatus according to the embodiment of the present invention, the light generated by the light-emitting layer 132 can be emitted outside through the second electrode 133 in each pixel region of the display panel 100.

Each of the light-emitting devices 130 can further include an emitting function layer between the first electrode 131 and the light-emitting layer 132 and/or between the light-emitting layer 132 and the second electrode 133. The emitting function layer can include at least one of a hole injection layer (HIL), a hole transmitting layer (HTL), an electron transmitting layer (ETL) and an electron injection layer (EIL). Thus, in the display panel 100 of the 3D display apparatus according to the embodiment of the present invention, the efficiency of each light-emitting device 130 can be improved.

Each of the light-emitting devices 130 can be electrically connected to a driving circuit. Each of the driving circuits can generate a driving current corresponding to a data signal according to a scan signal. For example, each of the driving circuits can include a thin film transistor 120. The thin film transistor 120 can include a semiconductor pattern 121, a gate insulating layer 122, a gate electrode 123, an interlayer insulating layer 124, a source electrode 125 and a drain electrode 126.

The semiconductor pattern 121 can include a semiconductor material. For example, the semiconductor pattern 121 can include silicon. The semiconductor pattern 121 can be an oxide semiconductor. For example, the semiconductor pattern 121 can include a metal oxide, such as IGZO. The semiconductor pattern 121 can include a source region, a drain region and a channel region. The channel region can be disposed between the source region and the drain region. The source region and the drain region can have a lower resistance than the channel region.

The gate insulating layer 122 can be disposed on the semiconductor pattern 121. The gate insulating layer 122 can extend beyond the semiconductor pattern 121. For example, a side surface of the semiconductor pattern 121 can be covered by the gate insulating layer 122. The gate insulating layer 122 can include an insulating material. For example, the gate insulating layer 122 can include silicon oxide (SiO) or silicon nitride (SiN). The gate insulating layer 122 can include a high-K material. For example, the gate insulating layer 122 can include titanium oxide (TiO). The gate insulating layer 122 can have a multi-layer structure.

The gate electrode 123 can be disposed on the gate insulating layer 122. The gate electrode 123 can overlap the channel region of the semiconductor pattern 121. For example, the gate electrode 123 can be insulated from the semiconductor pattern 121 by the gate insulating layer 122. The gate electrode 123 can include a conductive material. For example, the gate electrode 123 can include a metal, such as aluminum (Al), chromium (Cr), copper (Cu), titanium (Ti), molybdenum (Mo) and tungsten (W).

The interlayer insulating layer 124 can be disposed on the gate electrode 123. The interlayer insulating layer 124 can extend beyond the semiconductor pattern 121. For example, a side surface of the gate electrode 123 can be covered by the interlayer insulating layer 124. The interlayer insulating layer 124 can include an insulating material. For example, the interlayer insulating layer 124 can include silicon oxide (SiO).

The source electrode 125 can be disposed on the interlayer insulating layer 124. The source electrode 125 can be electrically connected to the source region of the semiconductor pattern 121. For example, the gate insulating layer 122 and the interlayer insulating layer 124 can include a source contact hole partially exposing the source region of the semiconductor pattern 121. The source electrode 125 can be in direct contact with the source region of the semiconductor pattern 121 in the source contact hole. The source electrode 125 can include a conductive material. For example, the source electrode 125 can include a metal, such as aluminum (Al), chromium (Cr), copper (Cu), titanium (Ti), molybdenum (Mo) and tungsten (W). The source electrode 125 can include a material different from the gate electrode 123.

The drain electrode 126 can be disposed on the interlayer insulating layer 124. The drain electrode 126 can be electrically connected to the drain region of the semiconductor pattern 121. The drain electrode 126 can be spaced away from the source electrode 125. For example, the gate insulating layer 122 and the interlayer insulating layer 124 can include a drain contact hole partially exposing the drain region of the semiconductor pattern 121. The drain electrode 126 can be in direct contact with the drain region of the semiconductor pattern 121 in the drain contact hole. The drain electrode 126 can include a conductive material. For example, the drain electrode 126 can include a metal, such as aluminum (Al), chromium (Cr), copper (Cu), titanium (Ti), molybdenum (Mo) and tungsten (W). The drain electrode 126 can include the same material as the source electrode 125. The drain electrode 126 can include a material different from the gate electrode 123.

Each of the driving circuits can be disposed between the device substrate 110 and the first electrode 131 of the corresponding light-emitting device 130. For example, the semiconductor pattern 121 of each thin film transistor 120 can be disposed close to the device substrate 110. Thus, in the display panel 100 of the 3D display apparatus according to the embodiment of the present invention, the light emitted from each light-emitting device 130 can be not blocked by the corresponding driving circuits.

A buffer layer 111 can be disposed between the device substrate 110 and the driving circuits. The buffer layer 111 can prevent pollution due to the device substrate 110 in a process of forming the driving circuits. For example, the buffer layer 111 can be disposed between the device substrate 110 and the semiconductor pattern 121 of each driving circuit. The buffer layer 111 can extend beyond the semiconductor patterns 121 of each driving circuit. For example, an entirely surface of the device substrate 110 toward the driving circuits can be covered by the buffer layer 111. The buffer layer 111 can include an insulating material. For example, the buffer layer 111 can include silicon oxide (SiO) and/or silicon nitride (SiN). The buffer layer 111 can have a multi-layer structure.

A lower passivation layer 112 can be disposed between the driving circuits and the light-emitting devices 130. The lower passivation layer 112 can prevent damage of the driving circuits due to an external impact and moisture. For example, the lower passivation layer 112 can cover an entirely surface of the driving circuits toward the light-emitting devices 130. The lower passivation layer 112 can extend beyond the source electrode 125 and the drain electrode 126 of each driving circuit. The lower passivation layer 112 can include an insulating material. For example, the lower passivation layer 112 can include silicon oxide (SiO) or silicon nitride (SiN).

An over-coat layer 113 can be disposed between the lower passivation layer 112 and the light-emitting devices 130. The over-coat layer 113 can remove a thickness difference due to the driving circuits. For example, a surface of the over-coat layer 113 opposite to the device substrate 110 can be a flat surface. The over-coat layer 113 can extend along the lower passivation layer 112. The over-coat layer 113 can include an insulating material. The over-coat layer 113 can include a material different from the lower passivation layer 112. For example, the over-coat layer 113 can include an organic material.

The lower passivation layer 112 and the over-coat layer 113 can include electrode contact holes exposing a portion of each thin film transistor 120. Each of the light-emitting devices 130 can be electrically connected to the corresponding thin film transistor 120 through one of the electrode contact holes. For example, the first electrode 131 of each light-emitting device 130 can be in direct contact with the drain electrode 126 of the corresponding thin film transistor 120 in the corresponding electrode contact hole.

An encapsulating element 140 can be disposed on the light-emitting devices 130. The second electrode 133 of each light-emitting device 130 can be disposed close to the encapsulating element 140. For example, the light-emitting devices 130 can be disposed between the device substrate 110 and the encapsulating element 140. The encapsulating element 140 can prevent damage of the light-emitting devices 130 due to the external impact and moisture. The encapsulating element 140 can extend beyond the light-emitting devices 130. For example, the light-emitting devices 130 can be covered by the encapsulating element 140.

The encapsulating element 140 can have a multi-layer structure. For example, the encapsulating element 140 can include a first encapsulating layer 141, a second encapsulating layer 142 and a third encapsulating layer 143, which are sequentially stacked on the second electrode 133 of each light-emitting device 130. The first encapsulating layer 141, the second encapsulating layer 142 and the third encapsulating layer 143 can include an insulating material. The second encapsulating layer 142 can include a material different from the first encapsulating layer 141 and the third encapsulating layer 143. For example, the first encapsulating layer 141 and the third encapsulating layer 143 can include an inorganic material, and the second encapsulating layer 142 can include an organic material. Thus, in the display panel 100 of the 3D display apparatus according to the embodiment of the present invention, the permeation of the external moisture can be effectively prevented, and a thickness difference due to the light-emitting devices 130 can be removed by the second encapsulating layer 142. For example, a surface of the third encapsulating layer 143 opposite to the device substrate 110 can be a flat surface.

Each of the light-emitting devices 130 can be controlled independently with adjacent light-emitting device 130. For example, the first electrode 131 of each light-emitting device 130 can be spaced away from the first electrode 131 of adjacent light-emitting device 130. A bank insulating layer 114 can be disposed in a space between adjacent first electrodes 131. For example, the bank insulating layer 114 can cover an edge of each first electrode 131. The light-emitting layer 132 and the second electrode 133 of each light-emitting device 130 can be stacked on a portion of the corresponding first electrode 131 exposed by the bank insulating layer 114. The bank insulating layer 114 can include an insulating material. For example, the bank insulating layer 114 can include an organic material. The bank insulating layer 114 can be in direct contact with the over-coat layer 113 at the outside of each first electrode 131. The bank insulating layer 114 can include a material different from the over-coat layer 113.

Each of the light-emitting devices 130 can realize a color different from adjacent light-emitting device 130. For example, the light-emitting layer 132 of each light-emitting device 130 can include a material different from the light-emitting layer 132 of adjacent light-emitting device 130. The light-emitting layer 132 of each light-emitting device 130 can be spaced away from the light-emitting layer 132 of adjacent light-emitting device 130. For example, the light-emitting layer 132 of each light-emitting device 130 can include an end on the bank insulating layer 114.

A voltage applied to the second electrode 133 of each light-emitting device 130 can be the same as a voltage applied to the second electrode 133 of adjacent light-emitting device 130. For example, the second electrode 133 of each light-emitting device 130 can be electrically connected to the second electrode 133 of adjacent light-emitting device 130. The second electrode 133 of each light-emitting device 130 can include the same material as the second electrode 133 of adjacent light-emitting device 130. For example, the second electrode 133 of each light-emitting device 130 can be in contact with the second electrode 133 of adjacent light-emitting device 130. The bank insulating layer 114 can be covered by the second electrode 133.

Each of the light-emitting devices 130 can have the same structure as adjacent light-emitting device 130. For example, each of the light-emitting devices 130 can include the emitting function layer same as adjacent light-emitting device 130. The emitting function layer of each light-emitting device 130 can be connected to the emitting function layer of adjacent light-emitting device 130. For example, in the display panel 100 of the 3D display apparatus according to the embodiment of the present invention, at least one of the hole injection layer (HIL), the hole transmitting layer (HTL), the electron transmitting layer (ETL) and the electron injection layer (EIL) can extend onto the bank insulating layer 114.

The display panel 100 can include a plurality of pixel regions including a blue pixel region BA, a red pixel region RA and a green pixel region GA which are arranged in a pen-tile shape. For example, the display panel 100 can include a first column L1 of pixel regions in which the blue pixel region BA and the red pixel region RA are alternatively disposed in a first direction Y, and a second column L2 of pixel regions in which the green pixel region GA is disposed. In the display panel 100 of the 3D display apparatus according to the embodiment of the present invention, the first column L1 of pixel regions and the second column L2 of pixel regions can be alternatively disposed in a second direction X perpendicular to the first direction Y. Each of the light-emitting devices 130 can be disposed in one of the plurality pixel regions. The light-emitting device 130 of each pixel region can emit the light displaying a color of the corresponding pixel region. For example, the light-emitting device 130 in each blue pixel region BA can emit the light displaying blue color, the light-emitting device 130 in each red pixel region RA can emit the light displaying red color, and the light-emitting device 130 in each green pixel region GA can emit the light displaying green color.

An optical element 200 can be disposed on the display panel 100. The optical element 200 can be disposed on a path of the light emitted from the display panel 100. For example, the optical element 200 can be disposed on the encapsulating element 140 of the display panel 100. The optical element 200 can prevent the reflection of the external light due to the display panel 100. For example, the optical element 200 can have a structure in which a quarter-wave plate (QWP) 210 and a linear polarizer 220 are stacked.

An optical adhesive layer 230 can be disposed between the quarter-wave plate 210 and the linear polarizer 220. The optical adhesive layer 230 can be in direct contact with the quarter-wave plate 210 and the linear polarizer 220. The optical adhesive layer 230 can have a refractive index between a refractive index of the quarter-wave plate 210 and a refractive index of the linear polarizer 220. For example, the refractive index of the optical adhesive layer 230 can be the same as the refractive index of the quarter-wave plate 210 or the refractive index of the linear polarizer 220. Thus, in the optical element 200 of the 3D display apparatus according to the embodiment of the present invention, an air-gap may not be formed between the quarter-wave plate 210 and the linear polarizer 220. For example, in the optical element 200 of the 3D display apparatus according to the embodiment of the present invention, the rapid change in the refractive index between the quarter-wave plate 210 and the linear polarizer 220 can be prevented. Therefore, in the optical element 200 of the 3D display apparatus according to the embodiment of the present invention, the loss of the light due to the rapid change in the refractive index can be prevented.

A display adhesive layer 410 can be disposed between the display panel 100 and the optical element 200. The display adhesive layer 410 can be in direct contact with the display panel 100 and the optical element 200. For example, the quarter-wave plate 210 can be attached to the third encapsulating layer 143 by the display adhesive layer 410. The display adhesive layer 410 can have a refractive index between a refractive index of the third encapsulating layer 143 and the refractive index of the quarter-wave plate 210. For example, the display adhesive layer 410 can include a material different from the optical adhesive layer 230. Thus, in the 3D display apparatus according to the embodiment of the present invention, the loss of the light due to the rapid change in the refractive index between the display panel 100 and the optical element 200 can be prevented.

Lenticular lenses 300 can be disposed on the optical element 200. The lenticular lenses 300 can realize a 3D image in a set region using the light emitted from each light-emitting device 130 of the display panel 100. Each of the lenticular lenses 300 can extend in a direction. The extending direction of the lenticular lenses 300 can have an inclination angle with the first direction Y. Each of the lenticular lenses 300 can include a portion overlapping with the plurality of pixel regions of the display panel 100.

A lens adhesive layer 420 can be disposed between the optical element 200 and the lenticular lenses 300. The lens adhesive layer 420 can be in direct contact with the optical element 200 and the lenticular lenses 300. For example, the lenticular lenses 300 can be attached to the linear polarizer 220 by the lens adhesive layer 420. The lens adhesive layer 420 can have a refractive index between the refractive index of the linear polarizer 220 and a refractive index of the lenticular lenses 300. For example, the lens adhesive layer 420 can include a material different from the display adhesive layer 410. Thus, in the 3D display apparatus according to the embodiment of the present invention, the loss of the light due to the rapid change in the refractive index between the optical element 200 and the lenticular lenses 300 can be prevented.

Each of the lenticular lenses 300 can extend obliquely based on the first direction Y. FIG. 3 is a view showing a plane of the 3D display apparatus according to the embodiment of the present invention, when the inclination angle θ1 of each lenticular lens 300 relative to the first direction Y is 36.87°. Herein, in the 3D display apparatus according to the embodiment of the present invention, each of the plurality of pixel regions can have a relatively long length in the first direction Y. Referring FIG. 3, it can be seen that the area ratios of the blue pixel areas BA, the red pixel areas RA, and the green pixel areas GA are the same at each viewing point V1 to V7. Thus, in the 3D display apparatus according to the embodiment of the present invention, the display panel 100 can include the plurality of pixel regions which are arranged in the pen-tile shape, the lenticular lenses 300 on the display panel 100 can extend obliquely, and the inclination angle of each lenticular lens 300 relative to the first direction Y can be 36.87°, such that the quality of the 3D image provided to the user can be maximum.

Figure 4A:
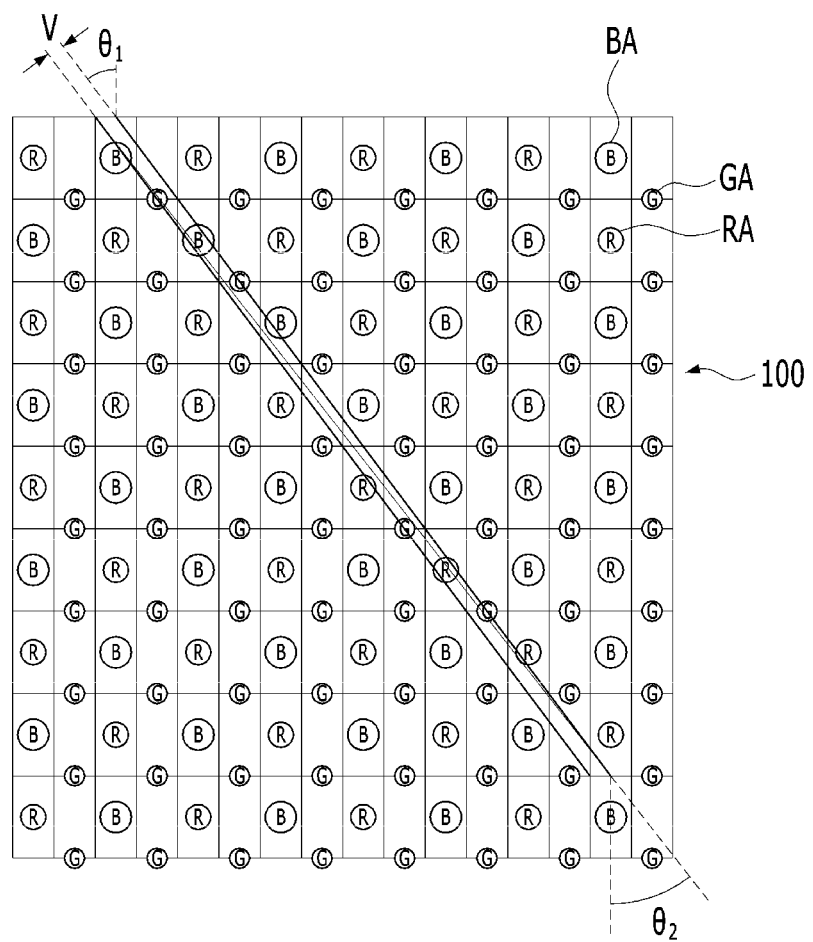
FIGS. 4A and 4B are views showing examples of the inclination angle of the lenticular lenses to maintain a constant color ratio in the 3D display apparatus according to the embodiment of the present invention.
Figure 4B:
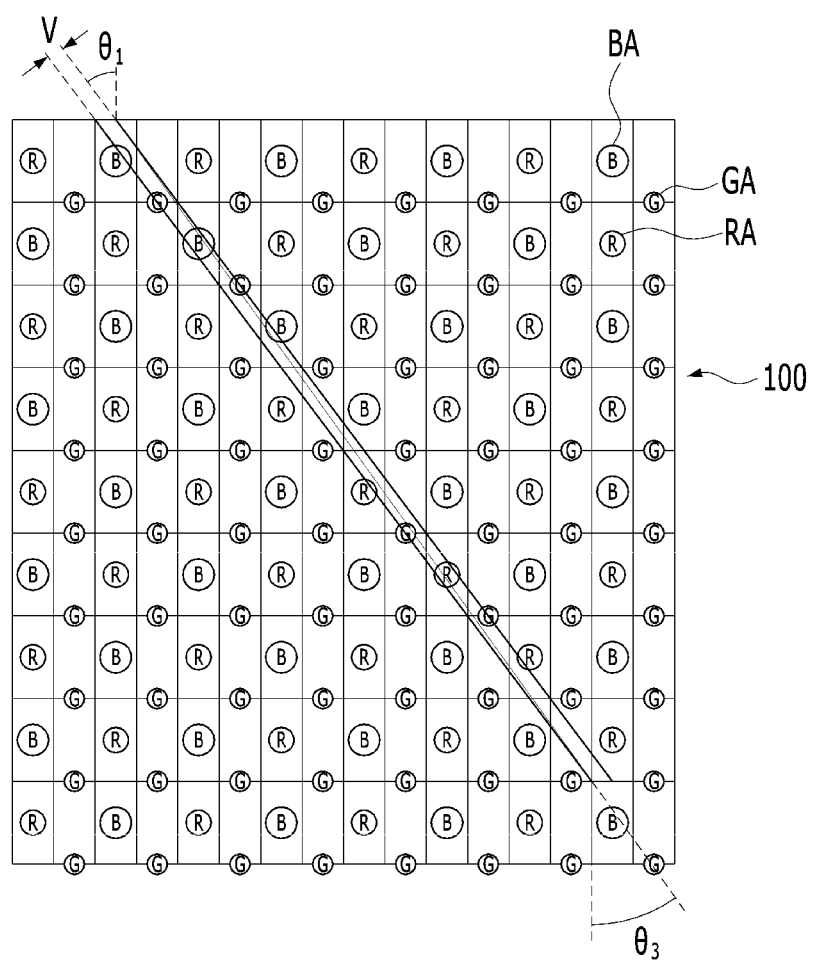

FIG. 4A is a view showing a single viewing point V overlapping with the plurality of pixel regions, when the inclination angle θ2 of each lenticular lens 300 relative to the first direction Y is 38° in the 3D display apparatus according to the embodiment of the present invention. FIG. 4B is a view showing another example of a single viewing point overlapping with the plurality of pixel regions, when the inclination angle θ3 of each lenticular lens 300 relative to the first direction Y is 35.71° in the 3D display apparatus according to the embodiment of the present invention.

Referring to FIGS. 4A and 4B, when the inclination angle is 38° or 35.71°, the area ratios of the blue pixel areas BA, the red pixel areas RA, and the green pixel areas GA overlapping with the single viewing point can be the same. Referring to FIGS. 4A and 4B, when the inclination angle exceeds 38° or less than 35.71°, a region of each lenticular lens can invade adjacent viewing point. Thus, in the 3D display apparatus according to the embodiment of the present invention, the inclination angle of each lenticular lens relative to the first direction Y can be 35.71° to 38°, in order to prevent the mixing of the viewing points.

Accordingly, the 3D display apparatus according to the embodiment of the present invention can include the display panel 100 and the lenticular lenses 300 on the display panel 100. The display panel 100 can include the plurality of pixel regions including the blue pixel region BA, the red pixel region RA and the green pixel region GA arranged in the pen-tile shape. The arrangement of the plurality of pixel regions can include the first column L1 of pixel regions in which the blue pixel region BA and the red pixel region RA are alternatively disposed in the first direction Y, and the second column L2 of pixel regions in which the green pixel region GA is disposed. The first column L1 of pixel regions and the second column L2 of pixel regions can be alternatively disposed in the second direction X. Each of the lenticular lenses 300 can have the inclination angle of 35.71° to 38° relative to the first direction Y. Thereby, in the 3D display apparatus according to the embodiment of the present invention, the mixing of the viewing points can be prevented, and the quality of the 3D image provided to the user can be improved.

A viewing angle control film 500 can be disposed on the lenticular lenses 300. The viewing angle control film 500 can block the light traveling toward the outside of the set region by the lenticular lenses 300. For example, the viewing angle control film 500 can prevent the generation of the repeated image in a region adjacent the set region. A surface of the lenticular lenses 300 toward the viewing angle control film 500 can have semi-circular shape. For example, an air-gap AG overlapping with the boundary of the lenticular lenses 300 can be disposed between the lenticular lenses 300 and the viewing angle control film 500, as shown in FIGS. 1 and 2. Thus, in the 3D display apparatus according to the embodiment of the present invention, the diffusion of the light by the lenticular lenses 300 can be effectively performed.

The viewing angle control film 500 can be physically coupled with the display panel 100 and the lenticular lenses 300. For example, a fixing element 600 can be disposed on an edge of the display panel 100 and an edge of the viewing angle control film 500. The fixing element 600 can be in direct contact with the edge of the display panel 100 and the edge of the viewing angle control film 500. Thus, in the 3D display apparatus according to the embodiment of the present invention, the viewing angle control film 500 can be stably coupled with the display panel 100 and the lenticular lenses 300.

The 3D display apparatus according to the embodiment of the present invention is described that the inclination angle of each lenticular lenses 300 relative to the first direction Y is 35.71° to 38°, preferably 36.87°. However, in the 3D display apparatus according to another embodiment of the present invention, the inclination angle of the lenticular lenses 300 can have the different range, as shown in FIGS. 5, 6A and 6B.

Figure 5:
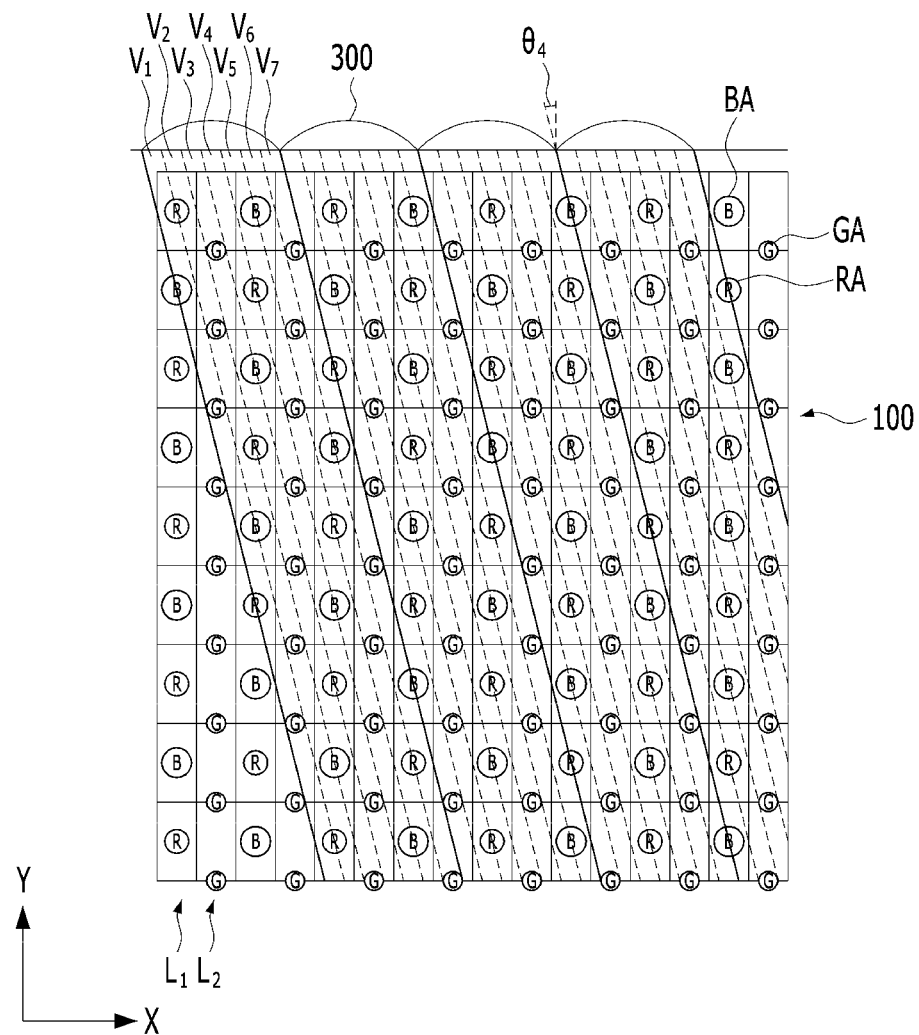
FIG. 5 is a view partially showing a plane of the 3D display apparatus according to another embodiment of the present invention.
Figure 6A:
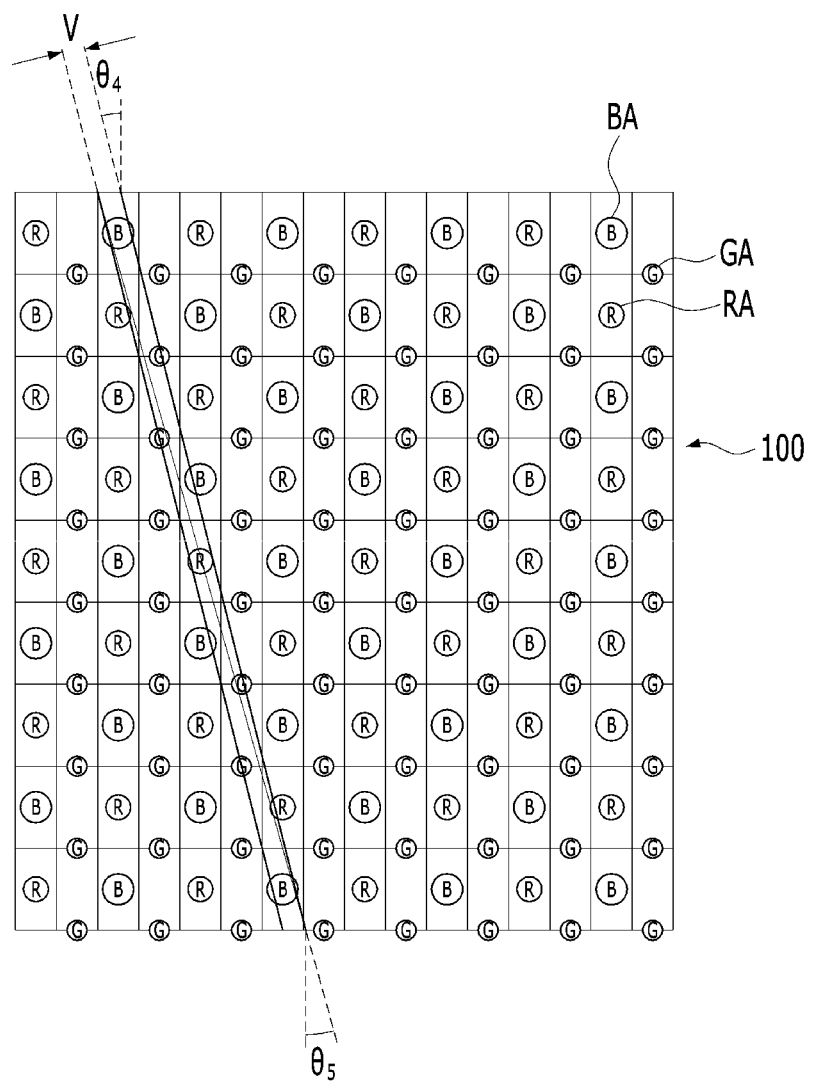
FIGS. 6A and 6B are views showing examples of the inclination angle of the lenticular lenses to maintain a constant color ratio in the 3D display apparatus according to another embodiment of the present invention.
Figure 6B:
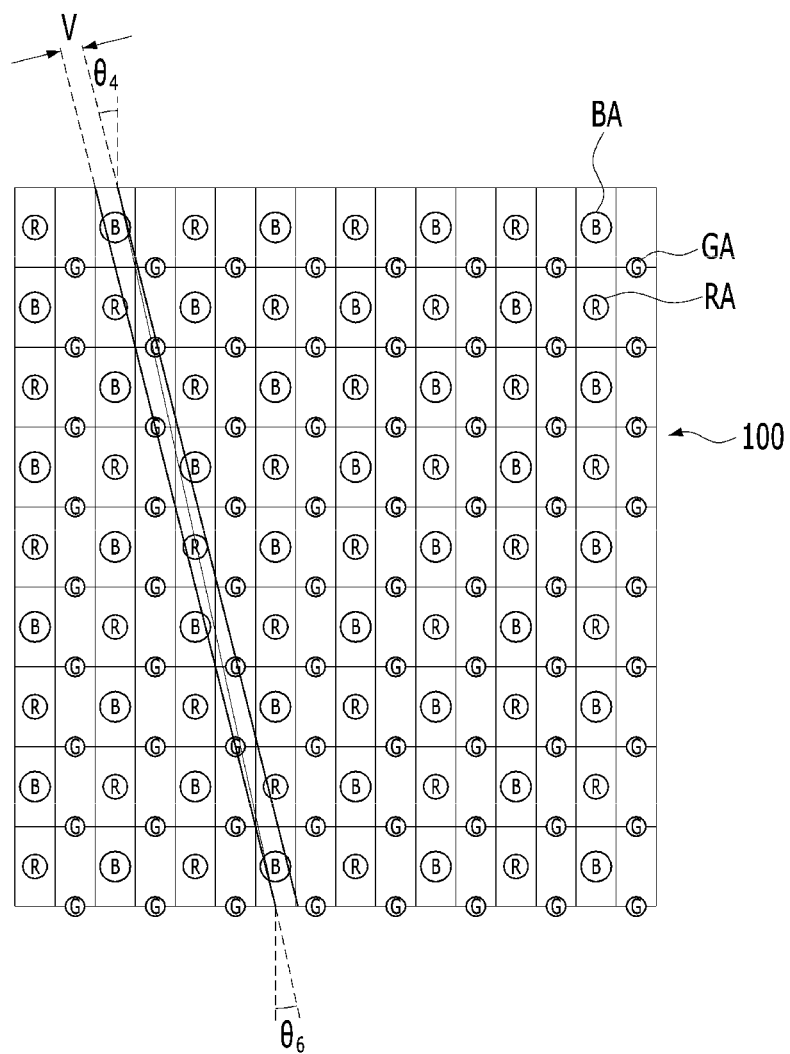

FIG. 5 is a view partially showing a plane of the 3D display apparatus according to another embodiment of the present invention, when the inclination angle θ4 of each lenticular lens 300 relative to the first direction Y is 14.04°. FIG. 6A is a view showing a single viewing point V overlapping with the plurality of pixel regions, when the inclination angle θ5 of each lenticular lens 300 relative to the first direction Y is 15.71° in the 3D display apparatus according to another embodiment of the present invention. FIG. 6B is a view showing another example of a single viewing point V overlapping with the plurality of pixel regions, when the inclination angle θ6 of each lenticular lens 300 relative to the first direction Y is 12.34° in the 3D display apparatus according to another embodiment of the present invention.

Referring FIG. 5, it can be seen that the area ratios of the blue pixel areas BA, the red pixel areas RA, and the green pixel areas GA are the same at each viewing point V1 to V7, when the inclination angle θ4 of each lenticular lens 300 relative to the first direction Y is 14.04°. Referring to FIGS. 6A and 6B, when the inclination angle θ4 is 12.34° to 15.71°, each lenticular lens may not invade adjacent viewing point. Thus, in the 3D display apparatus according to another embodiment of the present invention, the inclination angle of each lenticular lenses 300 relative to the first direction Y is 12.34° to 15.71°, preferably 14.04°.

As a result, the 3D display apparatus according to the embodiments of the present invention can comprise the lenticular lenses disposed on the display panel including the plurality of pixel regions arranged in the pen-tile shape, wherein the inclination angle of each lenticular lenses relative to the first direction can be either 35.71° to 38° or 12.34° to 15.71°. Thus, in the 3D display apparatus according to the embodiments of the present invention, the area ratios of the pixel regions displaying the different colors can be coincident at each viewing point. Thereby, in the 3D display apparatus according to the embodiments of the present invention, the quality of the 3D image provided to the user can be improved.

What is claimed is:

1. A three-dimensional (3D) display apparatus comprising:
   a display panel including first columns in which first pixel regions and second pixel regions are alternatively disposed in a first direction, and second columns in which third pixel regions are repeated, the first columns and the second columns being alternatively disposed in a second direction perpendicular to the first direction; and
   lenticular lenses on the display panel, each of the lenticular lenses inclined relative to the first direction,
   wherein the second pixel regions display a different color from the first pixel regions,
   wherein the third pixel regions display a different color from the first pixel regions and the second pixel regions, and
   wherein the inclination angle of each of the lenticular lenses relative to the first direction is in a range of 35.71° to 38°.

2. The 3D display apparatus according to claim 1, wherein the inclination angle of each of the lenticular lenses relative to the first direction is 36.87°.

3. The 3D display apparatus according to claim 1, wherein the third pixel region is alternately disposed with the first pixel region and the second pixel region in the second direction.

4. The 3D display apparatus according to claim 1, wherein a length of the first pixel region in the first direction is larger than a length of the first pixel region in the second direction.

5. A three-dimensional (3D) display apparatus comprising:
   a display panel including first columns in which first pixel regions and second pixel regions are alternatively disposed in a first direction, and second columns in which third pixel regions are repeated, the first columns and the second columns being alternatively disposed in a second direction perpendicular to the first direction; and
   lenticular lenses on the display panel, each of the lenticular lenses inclined relative to the first direction,
   wherein the second pixel regions display a different color from the first pixel regions,
   wherein the third pixel regions display a different color from the first pixel regions and the second pixel regions, and
   wherein the inclination angle of each of the lenticular lenses relative to the first direction is in a range of 12.34° to 15.71°.

6. The 3D display apparatus according to claim 5, wherein the inclination angle of each of the lenticular lenses relative to the first direction is 14.04°.

* * * * *